United States Patent
Hirata et al.

(10) Patent No.: US 7,695,160 B2
(45) Date of Patent: *Apr. 13, 2010

(54) PROJECTOR LIGHT SOURCE AND PROJECTION TYPE IMAGE DISPLAY DEVICE USING THE SAME

(75) Inventors: Koji Hirata, Yokohama (JP); Ryuji Kurihara, Yokohama (JP); Kobuo Masuoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 132 days.

This patent is subject to a terminal disclaimer.

(21) Appl. No.: 11/807,832

(22) Filed: May 29, 2007

(65) Prior Publication Data

US 2007/0236669 A1    Oct. 11, 2007

Related U.S. Application Data

(63) Continuation of application No. 10/105,916, filed on Mar. 20, 2002, now Pat. No. 7,316,487.

(30) Foreign Application Priority Data

Apr. 13, 2001    (JP)    ............................ 2001-114763

(51) Int. Cl.
*F21V 29/00*    (2006.01)
(52) U.S. Cl. ...................... 362/264; 362/294; 362/373; 353/56
(58) Field of Classification Search ................ 362/264, 362/294, 373; 353/56
See application file for complete search history.

(56) References Cited

U.S. PATENT DOCUMENTS

| 4,423,348 | A | * | 12/1983 | Greiler | ........................ | 362/264 |
| 4,555,748 | A |  | 11/1985 | Bradley |  |  |
| 5,985,465 | A |  | 11/1999 | Daichou et al. |  |  |
| 6,004,010 | A | * | 12/1999 | Inage et al. | ................ | 362/294 |
| 6,294,870 | B1 |  | 9/2001 | Kawashima et al. |  |  |
| 6,400,067 | B1 |  | 6/2002 | Manning et al. |  |  |
| 6,759,793 | B2 | * | 7/2004 | Narita | ........................ | 362/294 |
| 7,316,487 | B2 | * | 1/2008 | Hirata et al. | ................ | 362/264 |

FOREIGN PATENT DOCUMENTS

| CN | 1167897 A | 12/1997 |
| JP | 05-094709 A | 4/1993 |
| JP | 05-247333 A | 9/1993 |
| JP | 07-37403 A | 2/1995 |
| JP | 08-015701 A | 1/1996 |
| JP | 2000-187290 A | 7/2000 |
| JP | 2001-48116 A | 1/2001 |
| JP | 2001-035440 A | 2/2001 |
| JP | 2001-051348 A | 2/2001 |

* cited by examiner

*Primary Examiner*—Stephen F Husar
(74) *Attorney, Agent, or Firm*—Townsend and Townsend and Crew LLP

(57) ABSTRACT

A projector light source which facilitates molding of a reflector for obtaining a complicated reflecting surface and provides an improved cooling efficiency, which is characterized by molding the reflector of the light source using heat resistant plastic mixed with a high heat conductive material, whereby a molding accuracy is drastically improved compared to a heat resistant glass reflector, and a highly efficient light source is implemented by increasing a degree of design freedom using a high-order non-spherical reflecting surface. Furthermore, heat conductivity is increased by the use of a high heat conductive material for the reflector and heat dissipation to an outside is facilitated.

10 Claims, 11 Drawing Sheets

PROJECTOR LIGHT SOURCE AND PROJECTION TYPE IMAGE DISPLAY DEVICE USING THE SAME

CROSS-REFERENCE TO RELATED APPLICATIONS

This is a continuation application of U.S. application Ser. No. 10/105,916, filed Mar. 20, 2002 (now U.S. Pat. No. 7,316, 487) which in turn claims priority to Japanese Application No. 200-1114763, filed Apr. 13, 2001.

BACKGROUND OF THE INVENTION

The present invention relates to an improvement to a reflecting mirror (hereinafter referred to as "reflector") used for a light source of a projector such as a liquid crystal projector and an overhead projector or the like.

A projector such as a liquid crystal projector or an overhead projector or the like irradiates light from a light source onto an object (which corresponds to an image display device such as a liquid crystal panel in the case of a liquid crystal projector) and projects the light modulated by this object onto a screen, etc. using an optical device to display the image. This light source has a configuration combining a light emitting lamp and a reflector to irradiate the light of this lamp and condense it in a specific direction. As the lamp for this light source, a short-arc type metal halide lamp with a metal halide sealed in a light emitting tube and with a short inter-electrode distance was previously used. On the other hand, as the reflector of the light source, a reflector with a heat-resistant glass inner wall coated with a multi-layer film of titanium oxide and silicon dioxide was previously used. Then, the metal halide lamp was replaced by an ultra-high pressure mercury lamp, which realizes high brightness easily, or a xenon lamp, which provides high color rendering, and these are used widely. Among them, this ultra-high pressure mercury lamp improves the light emitting efficiency and realizes high brightness by elevating the vapor pressure of mercury to 200 atm or higher while the lamp is lit. Furthermore, by mixing additives other than mercury, the ultra-high pressure mercury lamp improves its spectral distribution characteristic and realizes high color rendering.

However, this high pressure mercury lamp is under severe restrictions on its operating temperature. There is also a problem that using the high pressure mercury lamp outside its optimal designed range reduces the light emitting efficiency as well as the life of the lamp tube.

The reflector used for this projector light source used to be obtained by applying press molding to heat resistant glass with a small coefficient of thermal expansion, then coating the inner wall of the reflector with an aluminum-evaporated film having a reflectance of approximately 90% and applying antioxidant treatment to this surface. In response to a demand from the market in recent years for a reflector that will realize higher brightness, a reflecting surface used for the reflector is provided with an optical multi-layer film made up of $TiO_2$ and $SiO_2$ capable of providing higher reflectance. Luminous flux emitted from this reflector is generally transformed to parallel or convergent luminous flux. Thus, the mainstream of the shape of the reflecting surface of the reflector is paraboloidal or ellipsoidal.

The spatial distribution of light emitted from a light source is equalized through a lighting optical system. The uniformly distributed light is irradiated onto an image display device with pixels arranged in a matrix form such as a liquid crystal panel or DMD (Digital Micro Mirror Device). The image display device forms an image based on a television signal supplied or a video signal from a computer and modulates the above-described uniformly distributed light on a pixel-by-pixel basis. The modulated light is magnified by a projection lens and projected onto a screen, etc. A display device in such a configuration with no screen is called a "projection type image projector (front projector)" and a display device with a screen is called a "rear projection type image display device". These projection type display devices are widely spread in the market as display devices suited to providing large screens.

FIG. 1 is a sectional view of a general light source for a projector using an ultra-high pressure mercury lamp as the light source. In the case of a light emitting tube in the power consumption 100 W class, the inner volume of a quartz glass light emitting tube 1 is 55 µl, electrodes 2 are sealed at both ends and the arc length between the electrodes is set to 1 to 1.4 mm. The light emitting tube 1 contains mercury as a light emitting substance and hydrogen bromide together with argon as starting aid gases with a predetermined ratio between the two gases. A molybdenum foil 4 is welded to an electrode central axis 3, forming an electrode sealed section 5. A base 6 is attached to the electrode sealed section 5 on the reflector bottom opening side. This base 6 is adhered or fixed to, through cement 8, the bottom of a reflector 7, on the inner surface of which a multi-layer reflection film is formed so that visible light is reflected and infrared rays are allowed to pass. In this case, the base 6 is fixed in such a way that the quasi-focal point of the reflector lies on the extension of the arc axis of the light emitting tube 1. Front plate glass 9 having almost the same coefficient of thermal expansion as that of the reflector 7 is set in the flange section of the front opening of this reflector 7. In the event of a burst of the light emitting tube, this front plate glass 9 is intended to prevent fragments of the light emitting tube from flying in all directions and reflection preventive coating is applied to both sides of the front plate glass 9.

FIG. 2 shows a mode of use of the projector light source shown in FIG. 1 when it is used as the light source for an actual optical apparatus such as a liquid crystal projector or overhead projector. In FIG. 2, the same components as those in FIG. 1 are assigned the same reference numerals and explanations thereof are omitted.

A cooling fan 10 is set on one side of or behind the projector light source and a desired cooling effect can be obtained by blowing air toward the reflector 7. Another method is to suction the air around the light source heated by lighting of the lamp and thereby produce an air flow to cool the reflector.

SUMMARY OF THE INVENTION

A desired shape of the reflector used for the projector light source using the above-described conventional technology is obtained by applying press molding to heat resistant glass. This heat resistant glass has less fluidity than resin and it is difficult to control temperature or weight of materials when press molding is applied to heat resistant glass. Moreover, since warm water or oil with large specific heat cannot be used to adjust temperature of the die, the conventional reflector has poor shape stability compared to general thermoplastic or thermohardened plastic materials.

FIG. 12 shows a block diagram of a two-piece reflector obtained by connecting a reflector 7a whose reflecting surface is ellipsoidal in cross section and a reflector 7b whose reflecting surface is circular in cross section (116 mm in diameter (radius of reflecting surface: 54 mm), 100 mm depth) and connecting the reflector 7a and the base 6 of the light-emitting tube 1, which is the light source, using cement.

In FIG. 12, the same components as those in FIG. 1 are assigned the same reference numerals and explanations thereof are omitted.

In order to confirm the accuracy of the shape of the reflector used for the projector light source, heat resistant glass was subjected to press molding and a prototype of the reflector 7b shown in FIG. 12 was created. As a result, the molding accuracy exceeded 700 μm, though the die was designed to have draft of 3 degrees, contraction of the molded product caused the reflector opening to have a quasi-vertical surface, which degraded mold releasing performance. Consequently, the molded product was deformed by 1300 μm into a saddle shape and it was impossible to obtain satisfactory performance.

Thus, the conventional reflector obtained by applying press molding to heat resistant glass has a problem with molding performance (die transfer performance or reproducibility), making it unavoidable to form a monotonous ellipsoidal or paraboloidal inner surface. In this way, the reflector made of heat resistant glass using the conventional technology has a first problem that it is not possible to stably obtain an accurate shape of the reflecting surface close to the designed shape.

Furthermore, the reflector made of heat resistant glass using the conventional technology is subjected to press molding, and therefore the drafting direction when the product is extracted from the die is limited to two directions, upward and downward. This causes a second problem that it is impossible to have a complicated shape such as providing projections and depressions on the outer wall surface of the reflector.

The present invention has been achieved in view of the problems in the above-described conventional technology. The invention provides a projector light source provided with a reflector, which features high accuracy, excellent molding and processing performance, and a projector equipped therewith.

More specifically, as described in claim 1, the invention is characterized by molding the reflector using a heat resistant organic material in which high heat conductive substances are mixed. Moreover, as described in claims 9 and 10, the outer surface of the reflector is provided with projections such as a heat radiating fin. This allows heat generated when the discharge lamp is turned on to be transmitted to the heat radiating fin through high heat conductive substances mixed in the reflector, making it possible to dissipate heat to the outside efficiently. This improves the cooling efficiency of the light source.

Attaching this heat radiating fin in a direction parallel to the air flow generated by the cooling fan (roughly the direction of light axis of the reflector) allows extremely efficient heat radiation.

Specific materials usable for the reflector are described in claim 11. That is, heat resistant organic materials to be used include a mixture of low contraction unsaturated polyester resin with thermoplastic polymer, hardener, filler, glass fiber or inorganic filler. Furthermore, high heat conductive substances mixed into this heat resistant organic material and used to improve heat conductivity include alumina hydroxide. A molded product resulting from molding the thermohardened resin (hereinafter referred to as "BMC (Bulk Molding Compound)") which is a mixture of the heat resistant organic material and high heat conductive substances allows accurate weight control or temperature control of the die and materials. This provides not only high shape accuracy but also excellent molding stability.

Thus, even if the shape of the inner surface of the reflector is changed from the conventional ellipsoidal or paraboloidal surface to a complicated shape including non-spherical and high-order coefficients as described in claims 3, 12 and 14, it is possible to obtain an accurate reflecting surface. Moreover, the BMC is capable of sliding the die from a plurality of directions such as a side core and vertical slide core die, making it possible to obtain high molding performance even with a complicated appearance. The projection type image projector or rear projection type image projector using the projector light source equipped with the reflector using the aforementioned technical means improves the light condensing efficiency, and can thereby obtain clear and satisfactory image characteristics.

The other objects, features and advantages of the present invention will become more apparent from the following detailed description of a preferred embodiment of the present invention with reference to the attached drawings.

DETAILED DESCRIPTION OF THE PREFERRED EMBODIMENT

With reference now to the attached drawings, an embodiment of the present invention will be explained below.

As a material of the reflector of the present invention, it is preferable to use, for example, Rigorack BMC (RNC-428) made by Showa Polymers Co., Ltd. obtained by mixing low contraction unsaturated polyester resin, which is a heat resistant organic material, with thermoplastic polymer as a low contraction agent, hardener, filler, glass fiber and inorganic filler, etc. to improve heat resistance. RNC-428 uses calcium carbonate as a filler and has heat conductivity as high as 0.5 W/m·k°. RNC-841 made by the above-described company mixes alumina hydroxide as a filler aiming at further improved heat conductivity has heat conductivity of 0.8 W/m·k°, which is approximately 1.6 times that of RNC-428.

Figure 12:
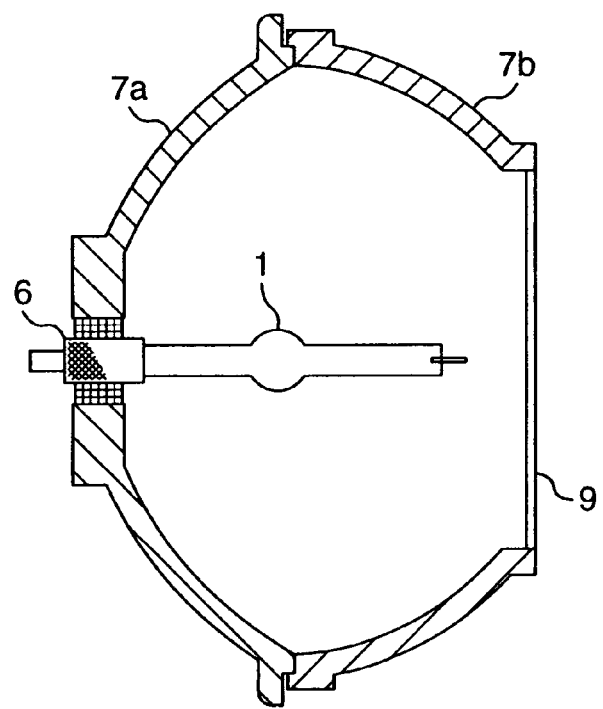

To confirm the shape accuracy of the reflector used for the projector light source of the present invention, a prototype of the spherical reflector shown by reference numeral 7b in aforementioned FIG. 12 (diameter: 116 mm (radius of the reflecting surface: 54 mm), depth: 100 mm) was created using Rigorack BMC (RNC-428) made by Showa Polymers Co., Ltd. As a result, a maximum deviation from the designed shape was 10 µm, high precision temperature adjustment and weight control accuracy of the die were 0.5% or below and it was possible to suppress inter-lot variations to 3 µm or below. The BMC also shows excellent mold releasing performance even if its molded surface is quasi-vertical and has excellent transfer performance such that its draft (minimum required gradient when a molded product is extracted from its die) is almost unnecessary. That is, it is possible to stably obtain the shape of the reflecting surface of an accurate reflector close to the designed shape.

Figure 18:
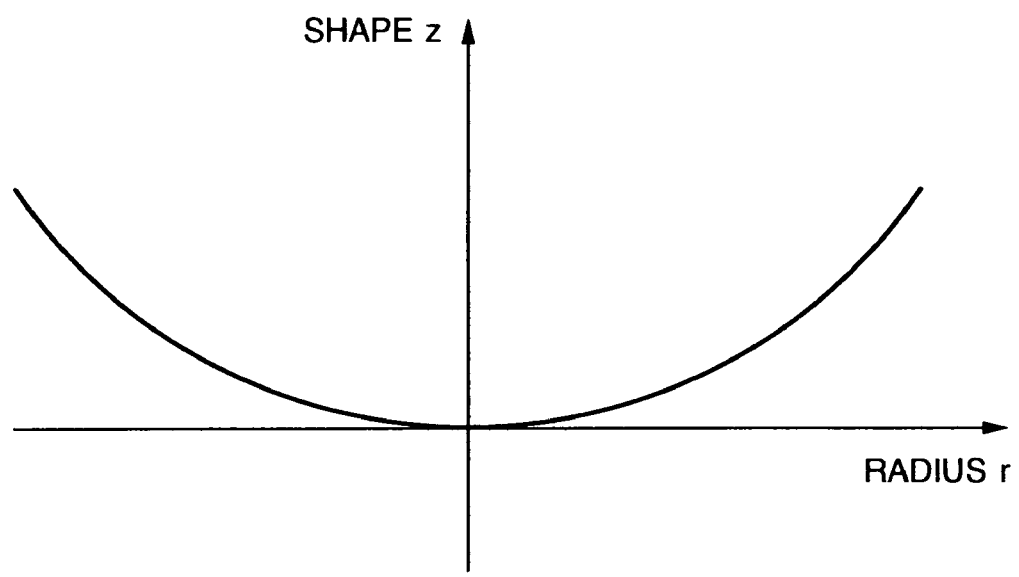
FIG. 18 illustrates a non-spherical shape.

Then, advantages in adopting a shape of the inner wall (reflecting surface) of the reflector 7, which includes coefficients of the fourth or higher order, will be explained. $Z(r)$ shown in Formula 1 denotes the height of the reflecting surface when the direction from the bottom face to the opening of the reflector (axis of the lamp bulb of the light emitting tube) is regarded as the Z-axis and the radial direction of the reflector is regarded as the r-axis as seen in FIG. 18 which illustrates a definition of the lens shape. Here, r denotes the distance in the radial direction, RD denotes the radius of curvature, CC, AE, AF, AG, AH, . . . , A denote arbitrary constants and n denotes an arbitrary natural number. Therefore, when coefficients CC, AE, AF, AG, AG, AH, etc. are given, the height of the reflector surface, that is, the reflector shape is determined according to Formula 1.

$$Z(r) = (1/RD)r^2/[1 + \sqrt{1-(1|CC)r^2(1/RD)^2}] + AE \cdot r^4 + AF \cdot r^6 + AG \cdot r^8 + AH \cdot r^{10} + \ldots + A \cdot r^n$$ [Formula 1]

In above Formula 1, when the cross-section of the reflecting surface of the conventional reflector is circular, only RD is given and CC=0; when paraboloidal, RD is given and CC=−1; when ellipsoidal, RD is given and if the value of CC is −1<CC<0, it is possible to define an ellipsoid which is rotationally symmetric with respect to the major axis and if 0<CC, it is possible to define an ellipsoid which is rotationally symmetric with respect to the minor axis.

On the other hand, the reflector of the present invention can easily obtain high shape accuracy as described above, even if it has a complicated shape including fourth or higher order coefficients as shown in Formula 1, the reflector of the present invention can obtain an accurate reflecting surface.

Figure 1:
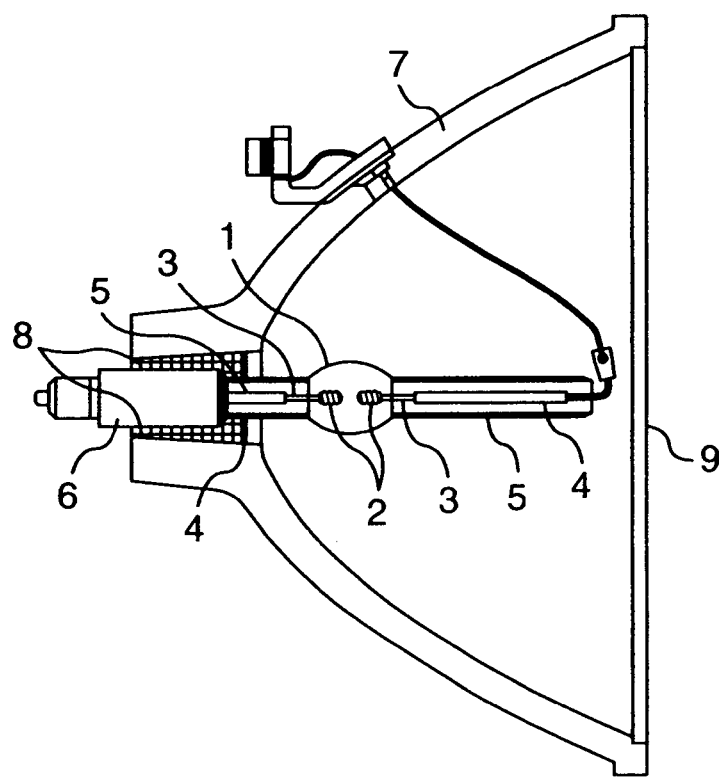
FIG. 1 is a sectional view of a general projector light source using an ultra-high pressure mercury lamp as a light emitting source.
Figure 2:
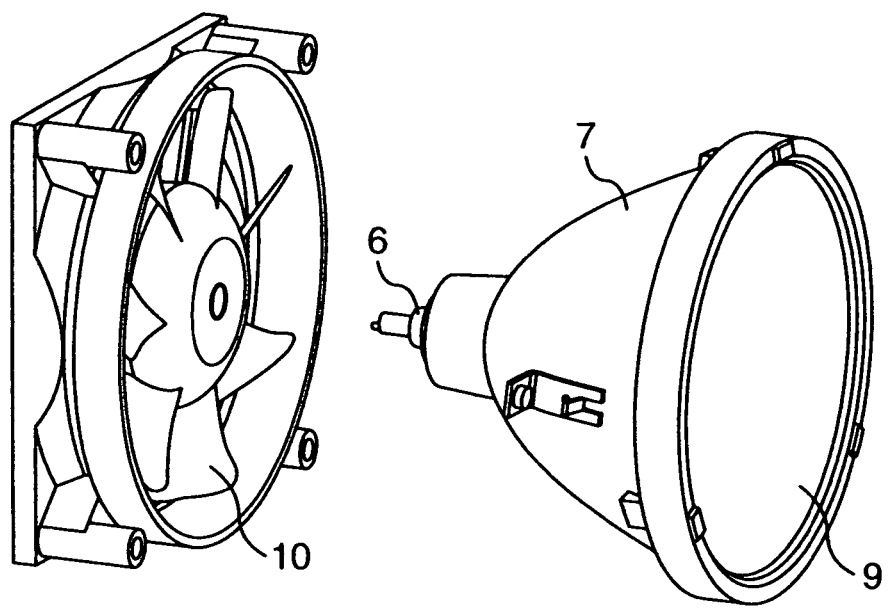
FIG. 2 is a layout plan showing a mode of use as an optical apparatus light source for a liquid crystal projector, etc.
Figure 11:
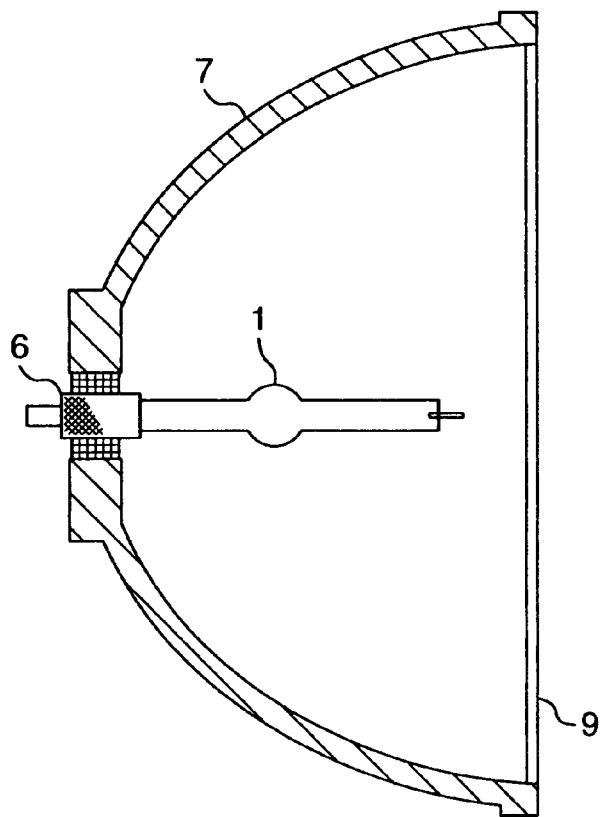
FIG. 11 and FIG. 12 are sectional views of the projector light source.

FIG. 11 is a block diagram showing the reflector 7 whose reflecting surface is paraboloidal in cross section connected with the base 6 of the light emitting tube 1 with cement. On the other hand, FIG. 12 is a block diagram showing a two-piece reflector obtained by connecting a reflector 7a whose reflecting surface is ellipsoidal in cross section and a reflector 7b whose reflecting surface is circular in cross section and connecting the reflector 7a and the base 6 of the bulb 1 with cement. In FIG. 11 and FIG. 12, the same components as those in FIG. 1 are assigned the same reference numerals and explanations thereof are omitted.

The shapes of the reflecting surfaces of both reflectors are conventionally designed assuming that the light emitting source is a point light source, but the actual light source is not a point light source and has a certain energy distribution and limited dimensions. Furthermore, it has an asymmetric light distribution characteristic.

Figure 13:
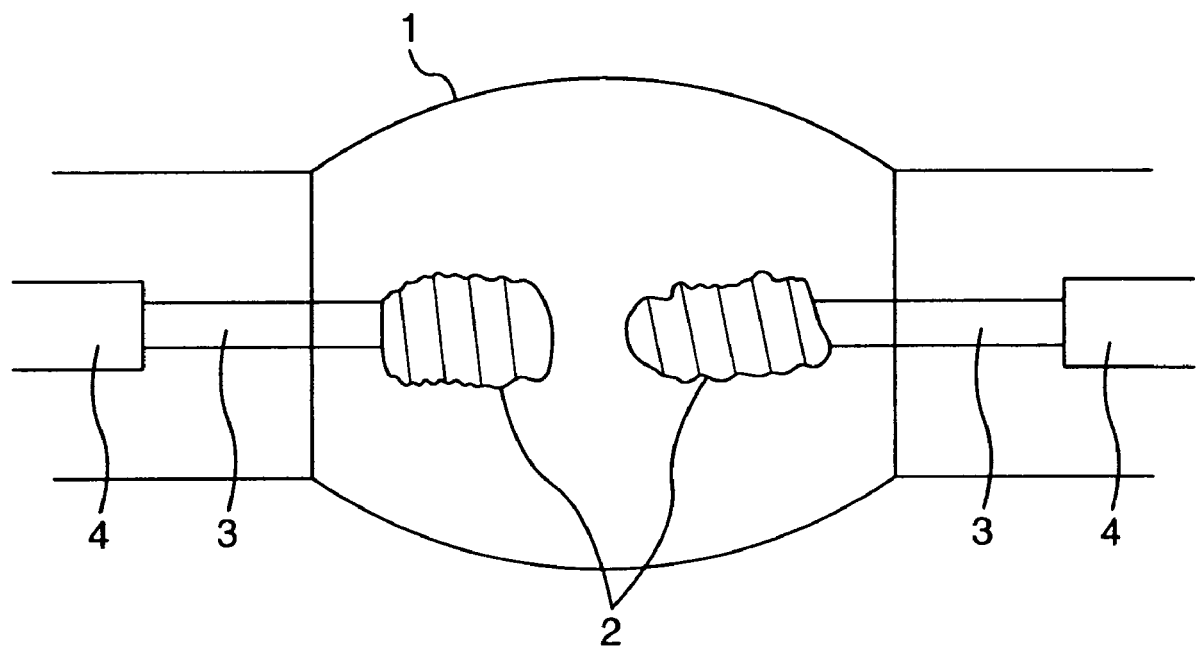
FIG. 13 is an enlarged view of a section of the bulb and its periphery of an ultra-high pressure mercury lamp.
Figure 14:
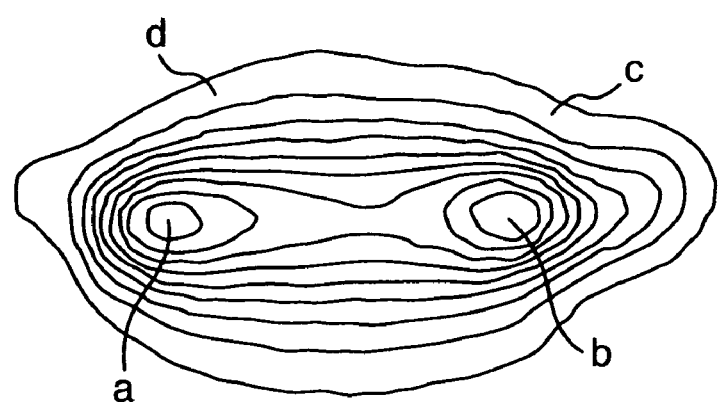
FIG. 14 illustrates a light emitting energy distribution of the bulb and its periphery while the ultra-high pressure mercury lamp is lit.

A specific example will be shown below. FIG. 13 is an enlarged view of a section of the bulb and its periphery of an AC driven ultra-high pressure mercury lamp of the projector light source shown in FIG. 1. FIG. 14 illustrates a light emitting energy distribution while the lamp is lit. In FIG. 13, a pair of electrodes 2 exist inside the quartz glass light emitting tube 1, there is an inter-electrode gap (arc length) of a limited length of 1.0 mm to 1.4 mm for a 100 W class bulb. Furthermore, as shown in FIG. 14, the light-emitting energy distribution in the periphery of the bulb while the lamp is lit is not uniform and the peripheries of the two electrodes are brightest (shown by a and b).

Figure 15:
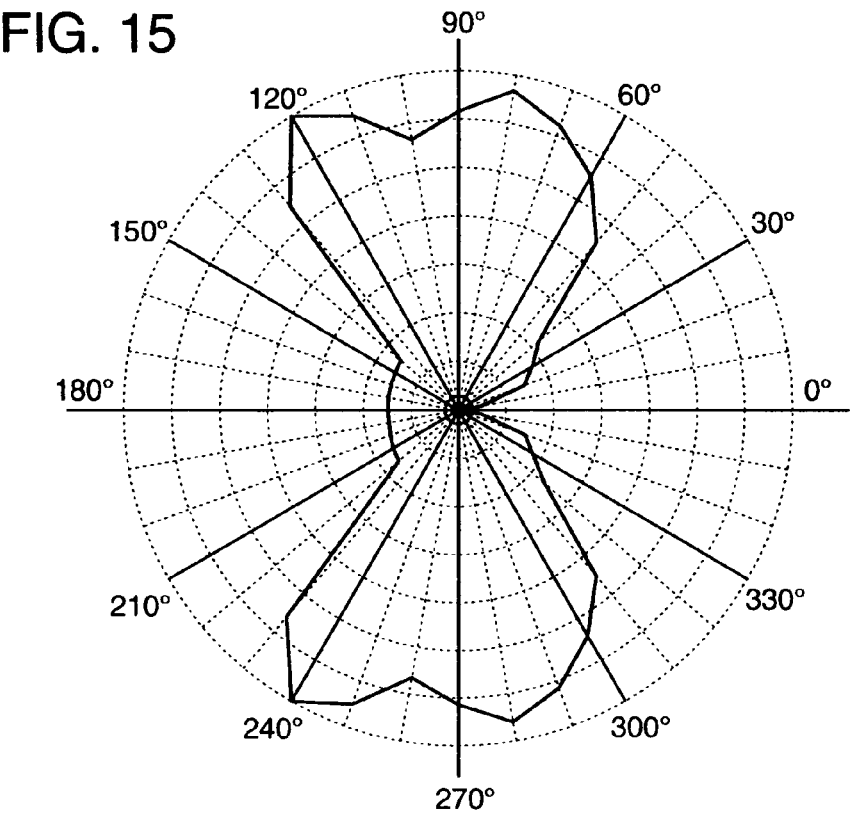
FIG. 15 illustrates a light distribution characteristic of a DC-driven ultra-high pressure mercury lamp.
Figure 16:
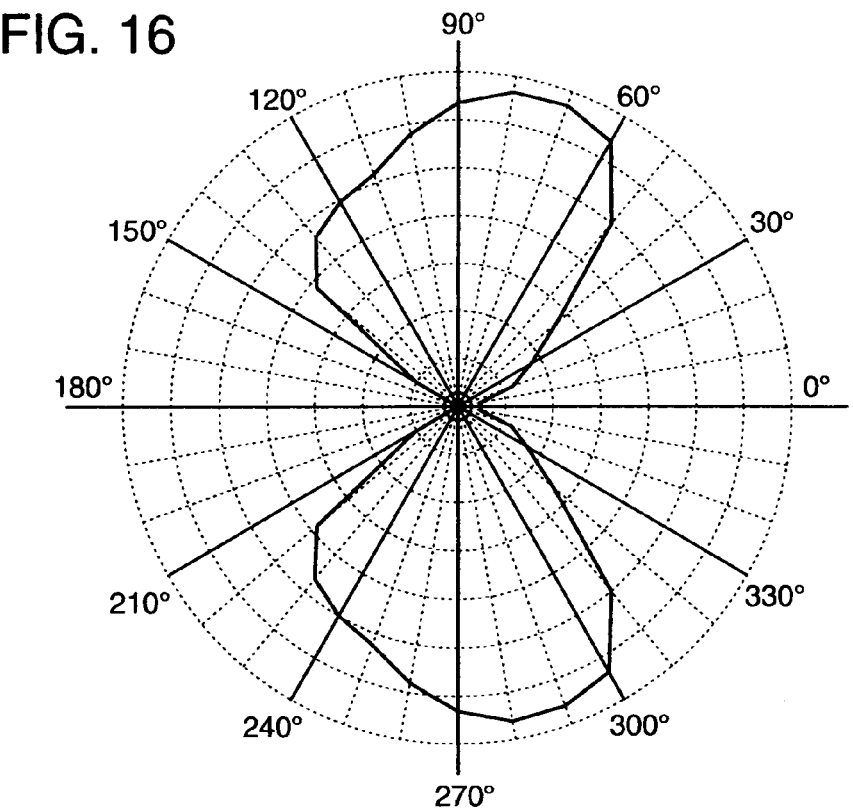
FIG. 16 illustrates a light distribution characteristic of an AC-driven ultra-high pressure mercury lamp.

FIG. 15 illustrates a light distribution characteristic of a DC-driven ultra-high pressure mercury lamp and FIG. 16 illustrates a light distribution characteristic of an AC-driven ultra-high pressure mercury lamp. The light distribution characteristic of the light emitting tube 1 is asymmetric with respect to the axis (90° to 270° in the figure) orthogonal to the lamp axis (0° to 180° in the figure) as shown in FIG. 15 and FIG. 16. The distribution characteristic of the DC-driven ultra-high pressure mercury lamp shown in FIG. 15 in particular shows greater asymmetry than the AC-driven ultra-high pressure mercury lamp shown in FIG. 16.

This is because the anode of the DC-driven ultra-high pressure mercury lamp generally has greater dimensions than those of the cathode and part of light is intercepted on the anode side.

As described above, the actual ultra-high pressure mercury lamp is regarded not as a point light source but as having two light sources and it is preferable that the reflector used in combination with the ultra-high pressure mercury lamp be of a shape having a plurality of focal points. In order for the reflector to have a plurality of focal points, it is an indispensable condition to have coefficients of the fourth or higher order in above-described Formula 1. In the case where the arc length exceeds 1.8 mm, the efficiency is reduced instead.

The advantages of adopting a shape including coefficients of the fourth or higher order for the inner wall surface (reflecting surface) of the reflector have been described so far. Since the present invention can stably obtain the accurate shape of a reflecting surface of a reflector close to the designed shape, it is possible to adopt a shape including coefficients of the fourth or higher order for the inner wall surface (reflecting surface) of the reflector.

Figure 17:
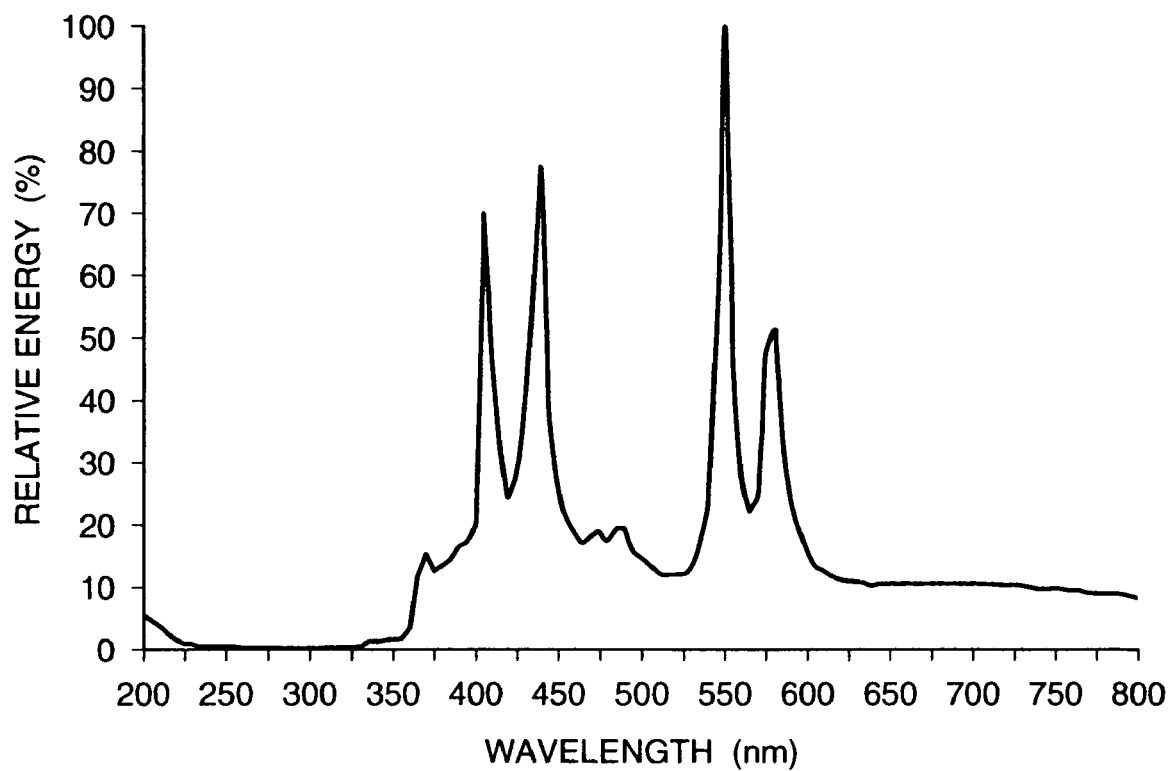
FIG. 17 illustrates a spectral energy distribution of a general ultra-high pressure mercury lamp.

FIG. 17 illustrates a spectral energy distribution of a general ultra-high pressure mercury lamp. Since a strong spectrum exists in the vicinity of blue 405 nm, it is preferable to have a half-value breadth (transmittance of 50%) wavelength of a UV cut filter of 420 nm or more. Moreover, the spectral energy also exists in the infrared area of 800 nm or greater (not shown), and therefore it is preferable that the reflecting film of the reflector have a characteristic so that light in the infrared area is allowed to pass, once absorbed by the reflector and then heat is dissipated to the outside. For this purpose, using a black color for the base material of the reflector makes it possible to obtain a high absorption characteristic.

As mentioned above, the present inventor et al. made a prototype of the spherical reflector (radius: 54 mm) indicated by reference numeral 7b of the two-piece reflector shown in FIG. 12 using Rigorack BMC (RNC-428) made by Showa Polymers Co., Ltd. and confirmed the shape accuracy. Furthermore, the present inventor et al. evaporated aluminum onto the inner surface to make it as the reflecting surface and measured temperatures on the reflecting surface and outer wall surface of the reflector when a 200 W ultra-high pressure mercury lamp was fixed to the reflector having a focal distance of 30 mm and turned on. The result showed that the temperature on the reflecting surface was 132° C. and the temperature on the outer wall surface was 83° C. in a non-wind condition at a room temperature of 20° C., which was a satisfactory result in making a prototype capable of attaining a margin close to 70° C. over 200° C. of thermal deformation temperature of the material. However, when the distance from the bulb to the inner wall surface of the reflector is taken into account, if the focal distance is 4 mm or below, there will be no longer margin over the heat resistance temperature. Moreover, it goes without saying that the heat resistance is questionable because even if input power exceeds 250 W, there will be no longer margin over the heat resistance temperature.

The BMC die is capable of sliding the die from a plurality of directions such as a side core and vertical slide core, which makes it possible to obtain high molding performance even with a complicated appearance. Using this, the invention adopts a complicated shape for the outer wall of the reflector provided with a heat radiating fin to improve heat resistance using this heat radiating fin.

Figure 3:
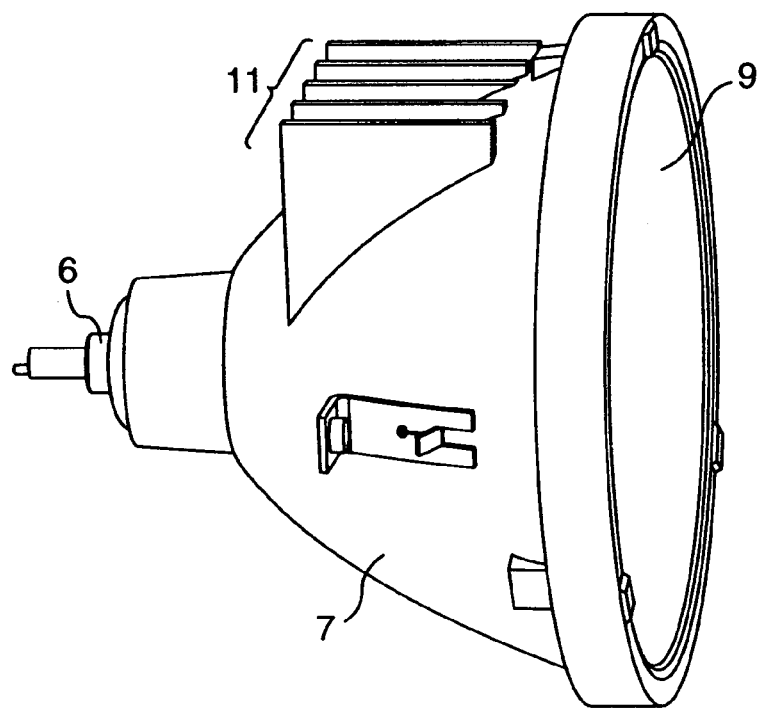
FIG. 3 to FIG. 8 are outside views each showing an embodiment of a projector light source according to the invention.

FIG. 3 shows an embodiment where a heat radiating fin is provided on the outer wall of the reflector. As shown in FIG. 3, providing the heat radiating fin 11 on the outer wall surface of the reflector 7 makes it possible to obtain higher heat dissipation performance. In FIG. 3, the same components as those in FIG. 1 are assigned the same reference numerals and explanations thereof are omitted.

Figure 4:
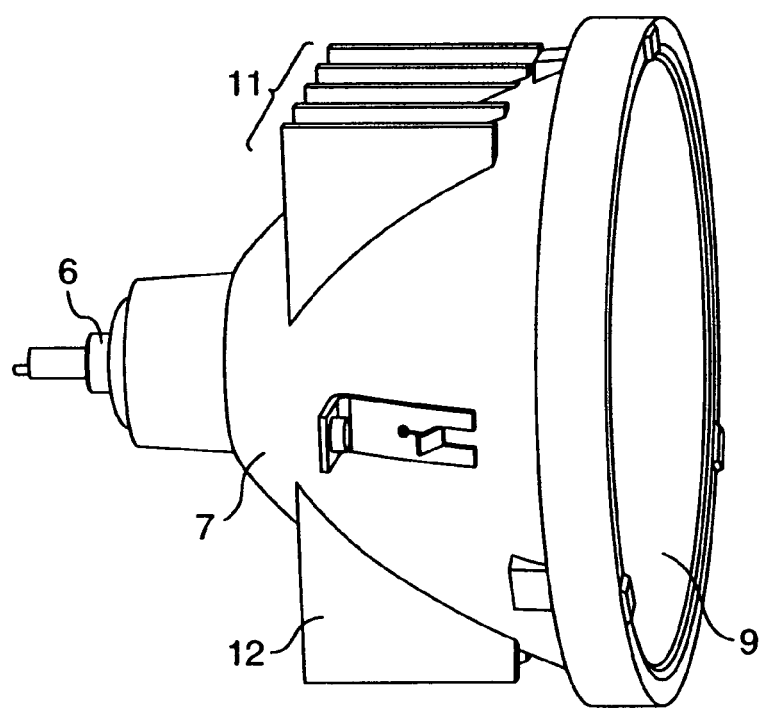

Furthermore, as shown in FIG. 4, in addition to the heat radiating fin 11 provided on top of the outer wall surface of the reflector 7, adding another heat radiating fin 12 to the bottom face can further improve the heat dissipation efficiency.

Figure 5:
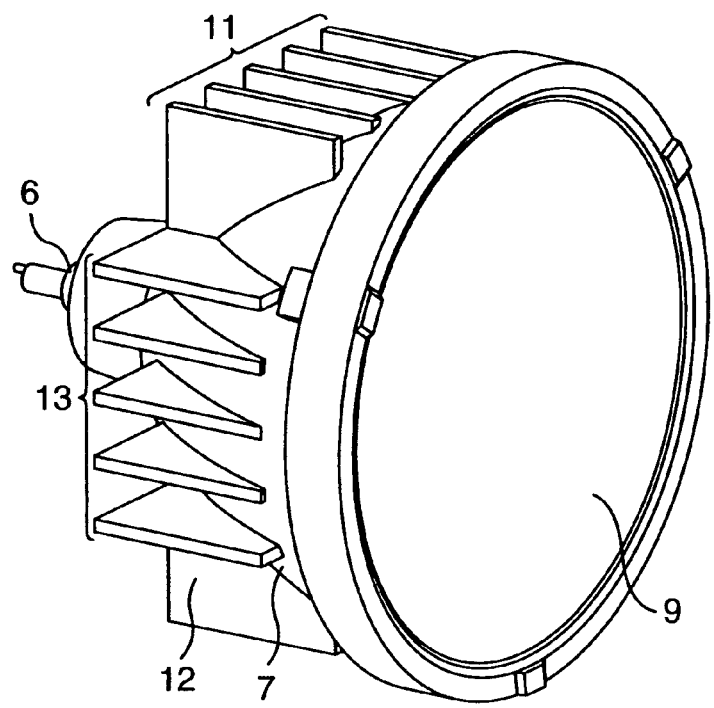

Furthermore, as shown in FIG. 5, providing the heat radiating fins 11 and 12 on the top and bottom faces of the outer wall surface of the reflector 7 and additional heat radiating fins 13 (the heat radiating fin on the right side on the outer wall surface is not shown) to the right and left sides of the outer wall surface with respect to the axis of the light emitting tube lamp bulb as the symmetric axis further makes it possible to obtain higher heat dissipation efficiency. The same components in FIG. 4 and FIG. 5 as those in the foregoing drawings are assigned the same reference numerals and explanations thereof are omitted.

Figure 9:
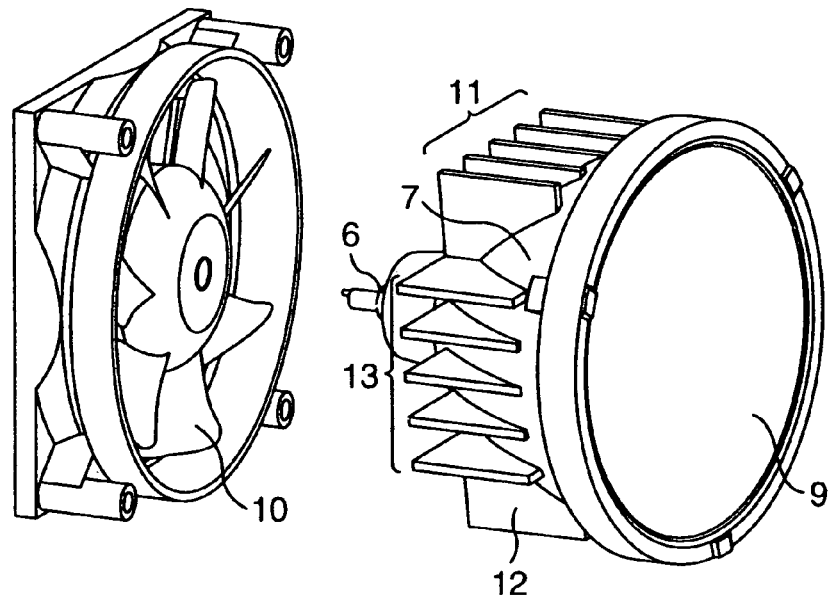
FIG. 9 and FIG. 10 illustrate a positional relationship between the projector light source of the invention and a cooling fan.

FIG. 9 shows a mode of use when the reflector of the invention shown in FIG. 5 is used as a light source for an actual optical apparatus such as a liquid crystal projector or overhead projector. The cooling efficiency can further be enhanced by providing a cooling fan 10 behind the projector light source and letting it blow air onto the reflector 7. The same components in FIG. 9 as those in the foregoing drawings are assigned the same reference numerals and explanations thereof are omitted.

As another method, it is also possible to create an air flow by suctioning the air around the light source warmed by lighting of the lamp to cool the apparatus.

Figure 6:
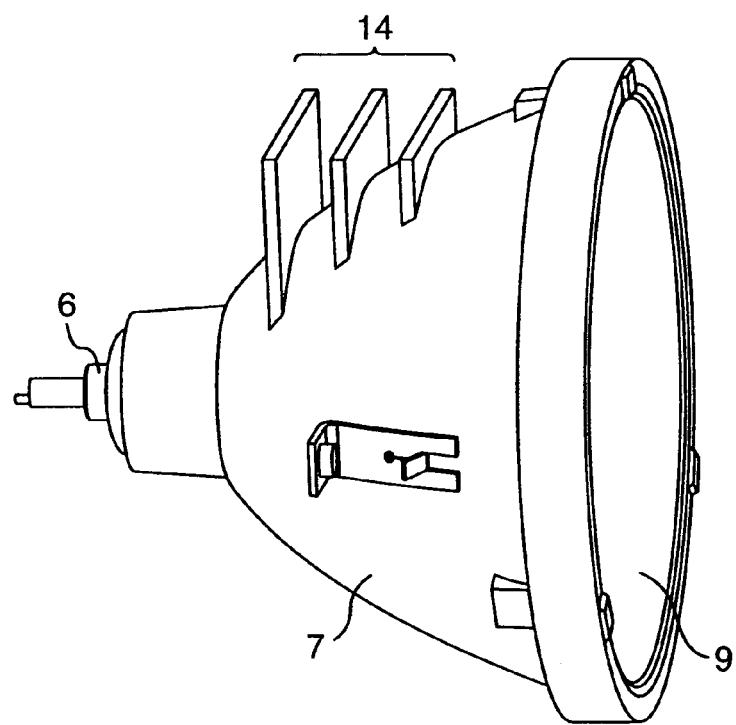
Figure 7:
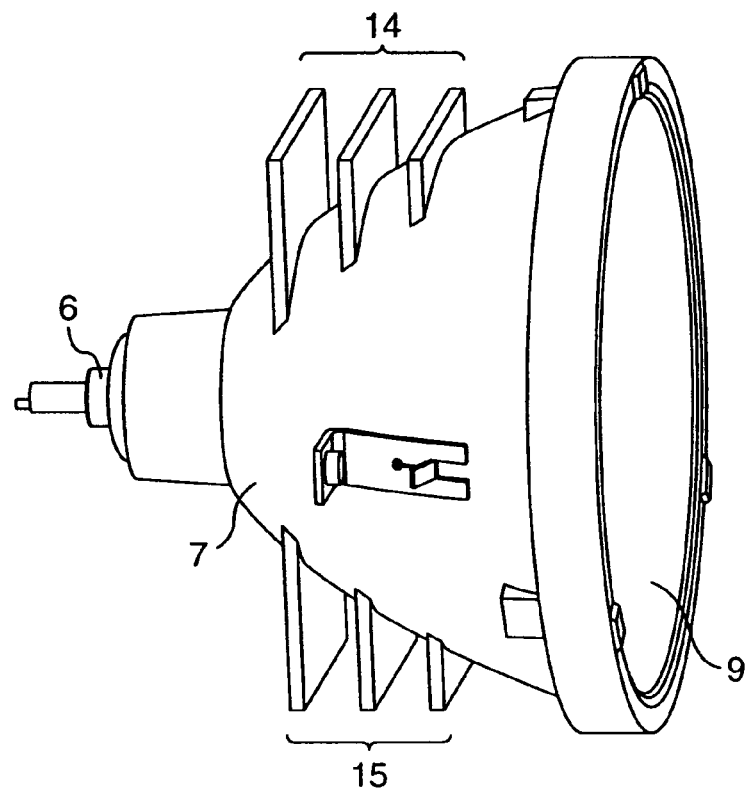
Figure 8:
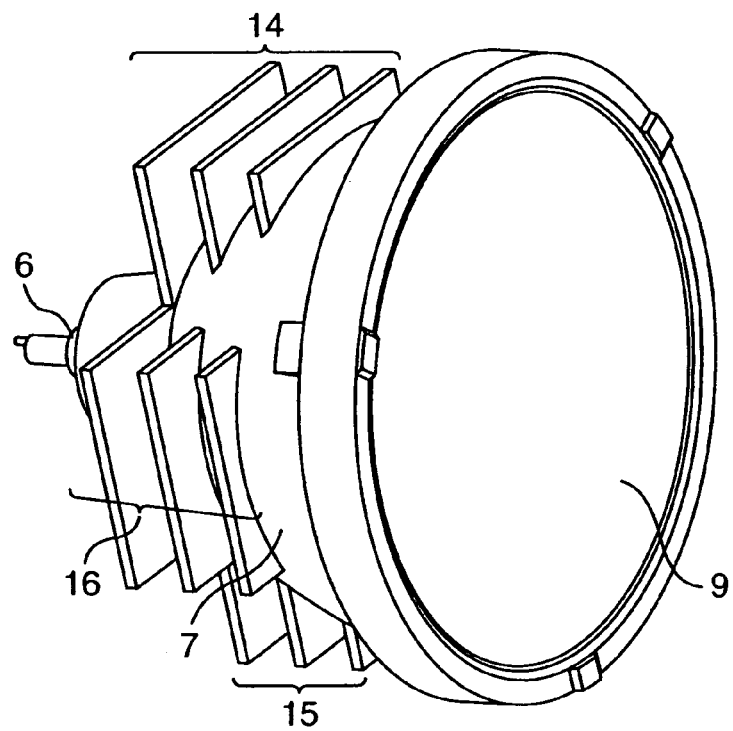

FIGS. 6 to 8 show other embodiments of the reflector of the present invention. In FIGS. 6 to 8, reference numerals 14 to 16 denote heat radiating fins and the same components as those in the foregoing drawings are assigned the same reference numerals and explanations thereof are omitted.

As shown in FIG. 6, there is provided a heat radiating fin 14 for the reflector which is orthogonal to the axis of the lamp bulb of the light emitting tube on top of the outer wall surface of the reflector 7. Furthermore, as shown in FIG. 7, it is also possible to improve the heat dissipation efficiency by adding another heat radiating fin 15 to the bottom of the outer wall surface of the reflector 7 in addition to the heat radiating fin 14 provided on top of the outer wall of the reflector 7. Furthermore, as shown in FIG. 8, providing heat radiating fins 14 and 15 on the top and bottom faces of the outer wall surface of the reflector 7 and additional heat radiating fins 16 (the heat radiating fin on the right side on the outer wall surface is not shown) to the right and left sides of the outer wall surface with respect to the axis of the light emitting tube lamp bulb as the symmetric axis further makes it possible to obtain higher heat dissipation efficiency.

Figure 10:
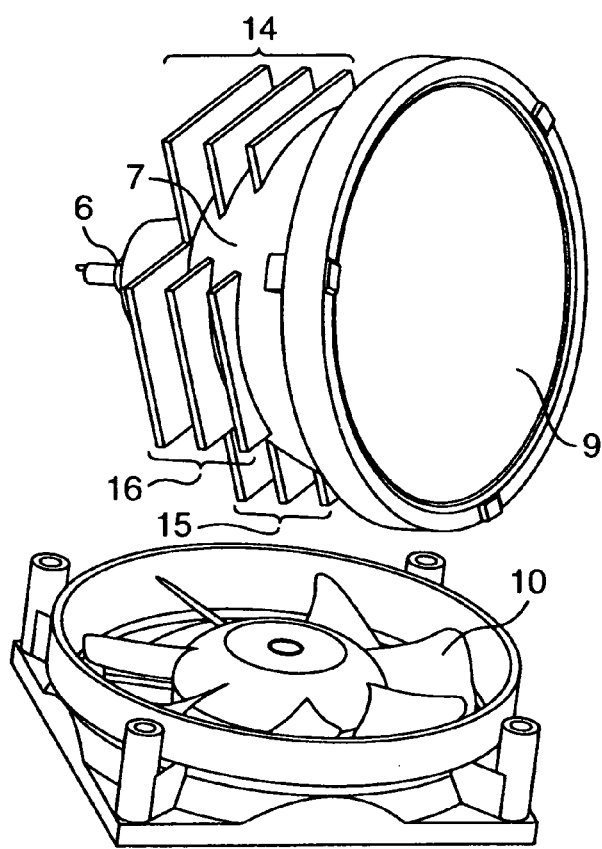

FIG. 10 shows a mode of use when the reflector of the present invention shown in FIG. 8 is used as a light source for an actual optical apparatus such as a liquid crystal projector or overhead projector. More specifically, FIG. 10 shows a positional relationship between the reflector and the cooling fan according to the present invention. The cooling efficiency can further be enhanced by providing a cooling fan 10 below the projector light source and letting it blow air onto the reflector 7. In FIG. 10, the same components as those in the foregoing drawings are assigned the same reference numerals and explanations thereof are omitted. As another method, it is also possible to create an air flow by suctioning the air around the light source warmed by lighting of the lamp to cool the apparatus.

The orientation of the heat radiating fin is different between FIGS. 3 to 5 and FIGS. 6 to 8, but when the light source of the present invention is attached to a projection image display device as a projector light source, it is natural that the heat radiating fin should be provided in parallel to the flow of wind generated by the cooling fan. By doing so, it is possible to provide extremely high efficient heat dissipation.

On the other hand, in the projector light source according to the present invention the average thickness of the reflector is gradually increased from the front opening to the bottom opening (section where the light emitting tube is housed) for the purpose of preventing a burst of the ultra-high pressure mercury lamp. This prevents fragments of the bulb glass due to the burst of the light emitting tube from flying in all directions. Such consideration is given because in the event of a burst of the bulb glass of the light emitting tube, the opening at the bottom of the reflector close to the light emitting tube receives a strong shock. The minimum required thickness of the reflector is 2 mm, and 3 mm is preferable when primary importance is attached to the molding performance. Furthermore, it is preferable that the opening at the bottom close to the bulb have an average thickness of 5 mm. An experiment shows that when the lamp bulb of the light emitting tube was burst while the lamp bulb was in use, no fragments flied to the outside when the above-described BMC reflector had a thickness of 5 mm or greater.

Furthermore, a front plate glass 9 for preventing scattering made of a material different from that of the reflector 7 is provided for the front opening to prevent fragments of the bulb glass due to a burst of the lamp from flying toward the lighting optical system. Applying reflection preventive coating to both sides of this front plate glass 9 alleviates reflection loss. By the way, a reflection preventive coat is evaporated onto both sides of the front plate glass, but when the inner absorption rate of the above-described front plate glass exceeds 5%, the reflection preventive coat may be subject to microcracks, etc. due to thermal expansion of the front plate glass with use for an extended period of time. It is therefore preferable to use the front plate glass of a material that minimizes internal absorption.

The specific embodiments of the invention using an ultra-high pressure mercury lamp have been explained so far, but it goes without saying that the same effects can also be obtained when a xenon lamp with excellent color rendering is used.

Figure 19:
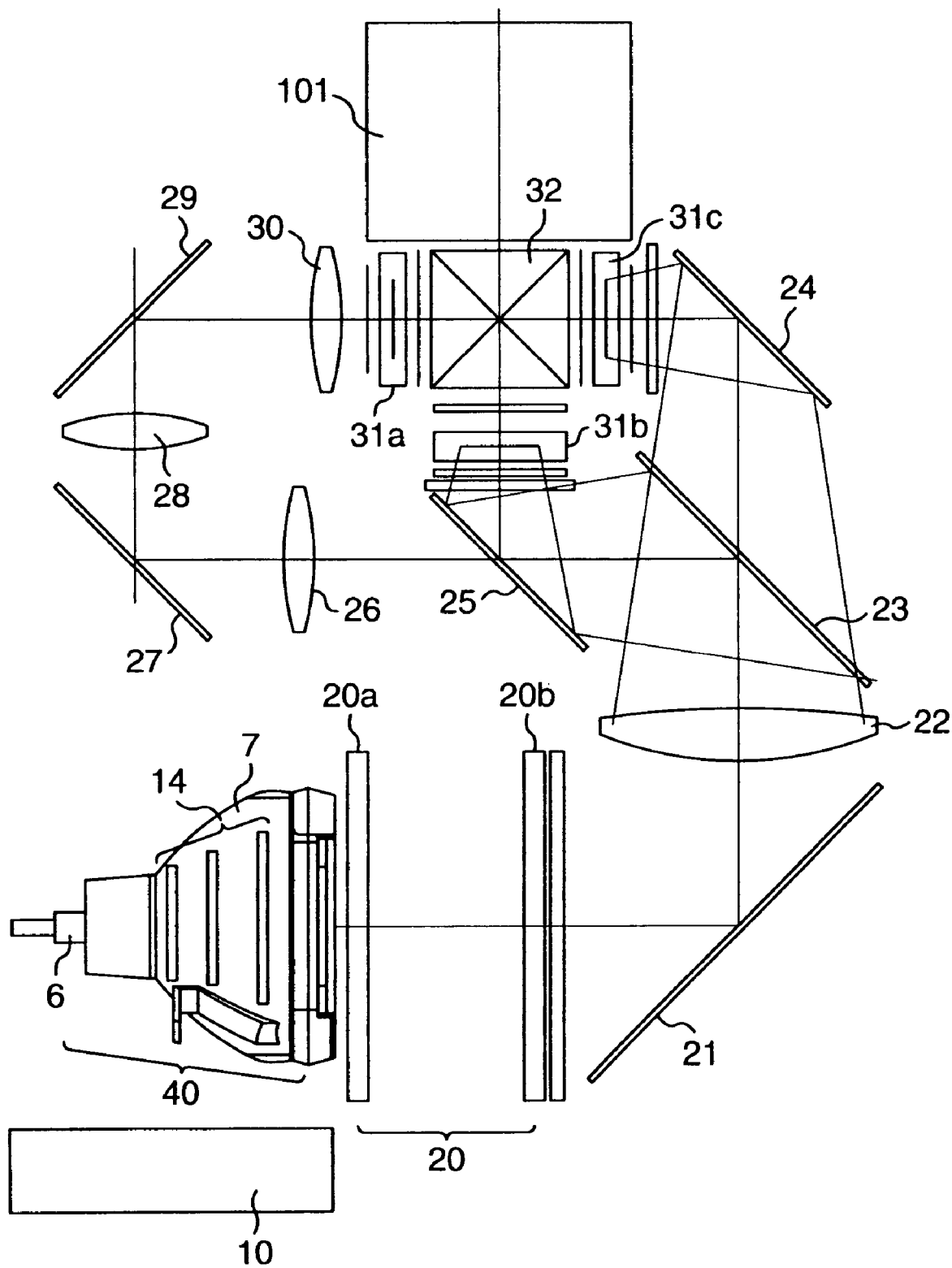
FIG. 19 illustrates a layout of a lighting optical system of a liquid crystal projector using the projector light source according to the invention.

FIG. 19 illustrates an example of a lighting optical system of a liquid crystal projector using the projector light source according to the invention. In FIG. 19, an integrator optical system 20 (hereinafter described as "multi-lens array") is provided with a first multi-lens array 20a, a polarization beam splitter and a second multi-lens array 20b. The first multi-lens array 20a is designed to split an incident luminous flux into a plurality of luminous fluxes through a plurality of square lens elements arranged in a matrix form. The polarization beam splitter is provided for each of the plurality of lens elements and designed to magnify the plurality of luminous fluxes split by the first multi-lens array 20a and irradiate them onto the liquid crystal panel with one flux superimposed on another. The second multi-lens array 20b has the polarization conversion function of emitting desired polarized wave using a ½λ phase difference plate. This projector light source 40 and multi-lens array 20 constitute a polarization lighting apparatus that emits desired polarized wave components. Here, the projector light source 40 is related to the embodiment of the present invention shown in FIGS. 3 to 8 and is provided with a heat radiating fin 14 which is orthogonal to the lamp axis. To one side of this projector light source 40 there is positioned the cooling fan 10, which supplies cooling air in the direction parallel to the direction in which the heat radiating fin 14 is attached. This allows the temperature of this projector light source 40 to be controlled to a desired temperature.

Then, an operation of each component of the optical system shown in FIG. 19 will be explained. A white luminous flux from the projector light source 40 is emitted through the multi-lens array 20 as luminous fluxes with desired polarized wave components, reflected by a reflection mirror 21 and entered into condenser lens 22. The condenser lens 22 condenses the luminous fluxes split by the multi-lens array 20 on liquid crystal panels 31a, 31b and 31c corresponding to red, green and blue, respectively with one luminous flux superimposed on another and provides uniform illumination in this way. The luminous fluxes that have passed through the condenser lens 22 are separated into red, green and blue color beams by dichroic mirrors 23 and 25 and introduced to the liquid crystal panels 31a, 31b and 31c, respectively. The color beams separated by the dichroic mirror 25 are reflected by the reflection mirrors 27 and 29 and introduced to the liquid crystal panel 31a. Thereby, since the color beam introduced to the liquid crystal panel 31a has a longer light path than other color beams in this way, the light path length and magnitude of luminous flux of this color beam are corrected by field lenses 26, 28 and 30. The color beams introduced to the liquid crystal panels 31a, 31b and 31c are subjected to light modulation by image signals (not shown), transmitted and color-combined by a beam combination prism 32. The color-combined beam is magnified by a projection lens 101 and projected onto a screen (not shown).

Figure 20:
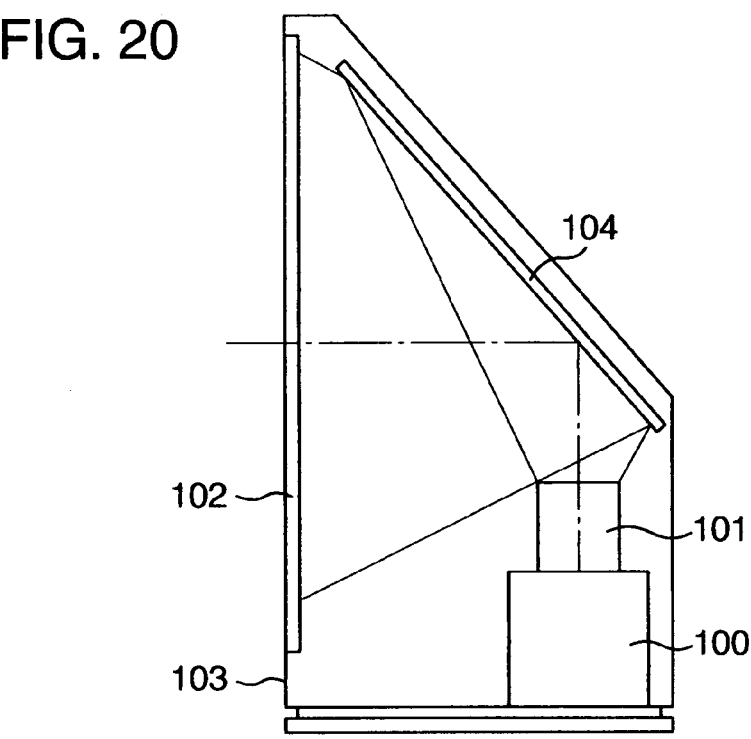
FIG. 20 and FIG. 21 are sectional views in the vertical direction of a rear projection type image display device equipped with a projection optical system according to the invention.
Figure 21:
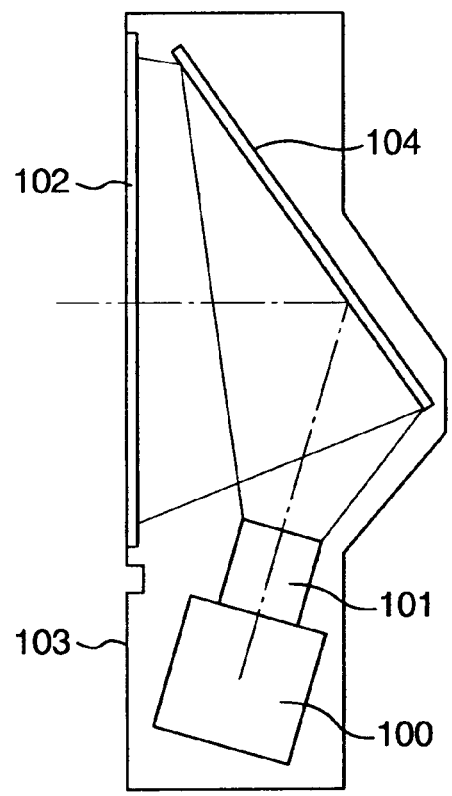

Then, FIGS. 20 and 21 are vertical sectional views showing main parts of a rear projection type image display device equipped with the projection optical system of the present invention and is constructed in such a way that an image captured by an optical unit 100 is magnified by a projection lens 101 and projected onto a screen 102 through a loopback mirror 104. FIG. 20 shows a configuration of a cabinet 103 with a reduced set height and FIG. 21 shows a configuration of the cabinet 103 with a reduced set depth.

Thus, the present invention forms a light source reflector using a heat resistant organic material mixed with high heat conductive substances, and can thereby obtain high molding performance and efficiently transmit heat produced by light emission of the lamp to the outside. Thus, the present invention allows the reflecting surface to have a complicated shape such as a non-spherical surface and thereby has the special effects of improving the lamp condensing efficiency and improving the light source cooling efficiency as well.

This embodiment has described a transmission type liquid crystal panel as an example of an image display device, but it goes without saying that a reflection type liquid crystal panel or DMD can also be used. Moreover, the material of the reflector described in this embodiment is a mere example and it is self-evident that various materials can also be used within the scope indicated by the appended claims and the modes thereof are also within the scope of the present invention.

It should be further understood by those skilled in the art that the foregoing description has been made on embodiments of the invention and that various changes and modifications may be made in the invention without departing from the spirit of the invention and scope of the appended claims.

What is claimed is:

1. A projector for irradiating light onto a display device comprising:
    a discharge lamp for emitting light;
    a reflector provided with a concave reflecting surface that reflects the light emitted from said discharge lamp and outputs the emitted light in a direction of an optical axis;
    a display device for modulating the light from said discharge lamp to a projected image light;
    a projection lens for projecting the light from said display device; and
    a fan for cooling said discharge lamp, wherein said reflector is formed of a heat resistant organic material mixed with high heat conductive substances having higher heat conductivity than that of said heat resistant organic material.

2. The projector according to claim 1, wherein the reflecting surface of said reflector has a paraboloidal or ellipsoidal shape.

3. The projector according to claim 1, wherein the reflecting surface of said reflector has a non-spherical shape.

4. The projector according to claim 1, wherein said discharge lamp is a short arc type discharge lamp which is lit with rated power of 250 W or less, constructed of a light emitting tube which seals at least xenon or mercury inside, includes a pair of electrodes at both ends with the distance between said electrodes being 1.8 mm or less.

5. The projector according to claim 1, wherein a front plate glass is provided on a light emitting side of said reflector.

6. The projector according to claim 1, wherein an average thickness of said reflector in the periphery of said discharge lamp is made greater than an average thickness of the light emitting section of said reflector.

7. The projector according to claim 4, wherein a material of said light emitting tube is quartz glass.

8. The projector according to claim 1, wherein a plurality of protrusions are provided on an external surface of said reflector.

9. The projector according to claim 8, wherein said cooling fan is arranged in a rear surface of said reflector, and said protrusions are a heat radiating fin and a direction in which said fin is attached is quasi-parallel to a direction of the optical axis of said reflector.

10. The projector light source according to claim 8, wherein said cooling fan is arranged in a side surface of said reflector, and said protrusions are a heat radiating fin and a direction in which said fin is attached is orthogonal to the direction of the optical axis of said reflector.

* * * * *

UNITED STATES PATENT AND TRADEMARK OFFICE
CERTIFICATE OF CORRECTION

PATENT NO. : 7,695,160 B2 Page 1 of 1
APPLICATION NO. : 11/807832
DATED : April 13, 2010
INVENTOR(S) : Hirata et al.

It is certified that error appears in the above-identified patent and that said Letters Patent is hereby corrected as shown below:

On the Title Page

At Item (75) Inventors,

"Kobuo Masuoka, Chigasaki (JP)"

should read,

--Nobuo Masuoka, Chigasaki (JP)--

Signed and Sealed this

Fourteenth Day of September, 2010

David J. Kappos
*Director of the United States Patent and Trademark Office*